US008355181B2

(12) United States Patent
Li

(10) Patent No.: US 8,355,181 B2
(45) Date of Patent: Jan. 15, 2013

(54) METHOD FOR PROCESSING NON-STANDARD FRAMES BY T.38 GATEWAYS

(75) Inventor: Ruihua Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1131 days.

(21) Appl. No.: 11/347,441

(22) Filed: Feb. 3, 2006

(65) Prior Publication Data

US 2006/0192995 A1 Aug. 31, 2006

(30) Foreign Application Priority Data

Feb. 3, 2005 (CN) .......................... 2005 1 0033094

(51) Int. Cl.
 H04N 1/23 (2006.01)
 G06F 3/12 (2006.01)
 H04N 1/00 (2006.01)
 H04N 1/40 (2006.01)
 G01R 31/08 (2006.01)
 H04M 11/00 (2006.01)

(52) U.S. Cl. ................. 358/300; 358/1.15; 358/426.1; 358/434; 358/438; 358/439; 358/466; 370/235; 379/100.17; 379/93.31

(58) Field of Classification Search ............... 358/1.15, 358/442, 426.1, 426.16, 434, 438, 439, 466; 370/235; 379/100.9, 100.17, 93.31
See application file for complete search history.

(56) References Cited

U.S. PATENT DOCUMENTS

| 5,125,025 | A | | 6/1992 | Lim | |
|---|---|---|---|---|---|
| 5,587,810 | A | * | 12/1996 | Feldman | ................. 358/442 |
| 5,790,641 | A | | 8/1998 | Chan et al. | |
| 6,038,037 | A | * | 3/2000 | Leung et al. | ................. 358/434 |
| 6,381,038 | B1 | | 4/2002 | Endo | |
| 6,700,676 | B1 | * | 3/2004 | Leung et al. | ................. 358/1.15 |
| 2001/0040702 | A1 | * | 11/2001 | Leung | ................. 358/434 |
| 2002/0034284 | A1 | | 3/2002 | Kang | |
| 2002/0101613 | A1 | * | 8/2002 | Endo | ................. 358/1.15 |

(Continued)

FOREIGN PATENT DOCUMENTS

JP 9261437 A 10/1997

(Continued)

OTHER PUBLICATIONS

*Procedures for real-time Group-3 facsimile communication over IP networks; T.38.* ITU-T International Telecommunication Union, Geneva, CH, No. T.38. Apr. 22, 2004.

(Continued)

*Primary Examiner* — Steven Kau
*Assistant Examiner* — Neil R McLean

(57) ABSTRACT

A method for processing non-standard facilities frames by T.38 gateways, wherein the T.38 gateways includes at least one transmitting gateway and at least one receiving gateway, the transmitting gateway is connected with a transmitting facsimile machine, and the receiving gateway is connected with a receiving facsimile machine. The method includes: a) the transmitting gateway and the receiving gateway determining the types of all received V.21 frames; b) when the receiving gateway or the transmitting gateway receives a non-standard frame NSF, modifying the non-standard frame NSF, so that the corresponding receiving facsimile machine or transmitting facsimile machine is unable to receive a correct NSF frame; c) the receiving gateway encapsulating the modified NSF frame data, or the transmitting gateway modulating the modified NSF frame data and transmitting the modulated frame data. The method modifies the rate negotiation performed with proprietary frames as a negotiation performed with standard frames.

10 Claims, 8 Drawing Sheets

Facsimile machine 1

Gateway 1

Gateway 2

Facsimile machine 2

U.S. PATENT DOCUMENTS

2004/0001221 A1* 1/2004 McCallum .................... 358/1.15
2005/0110616 A1 5/2005 Kajiwara

FOREIGN PATENT DOCUMENTS

| JP | 11-308428 | 11/1999 |
|---|---|---|
| JP | 2000332975 A | 11/2000 |
| JP | 2001203869 A | 7/2001 |
| JP | 2005-094620 | 4/2005 |

OTHER PUBLICATIONS

European Search Report dated Jun. 16, 2008 from European Patent Application No. 06705594.7.
International Search Report from International Application No. PCT/CN2006/000173.
Written Opinion of the International Searching Authority dated May 18, 2006 in connection with International Patent Application No. PCT/CN2006/000173.
Communication pursuant to Article 94(3) EPC dated Jul. 14, 2010 in connection with European Patent Application No. 06 705 594.7.
International Telecommunication Union, T.38, Series T: Terminals for Telematic Services, Facsimile—Group 3 protocols, "Procedures for real-time Group 3 facsimile communication over IP networks", Apr. 2007, 125 pages.
International Telecommunication Union, T.30, Series T: Terminals for Telematic Services, "Procedures for document facsimile transmission in the general switched telephone network", Apr. 1999, 288 pages.

* cited by examiner

| Address field (0xff) | Control field (0xc0) | Facsimile control (0x04) | Facsimile information (country code) | Facsimile information (manufacturer code) | Facsimile information (other parameters) | FCS | flag |
|---|---|---|---|---|---|---|---|

METHOD FOR PROCESSING NON-STANDARD FRAMES BY T.38 GATEWAYS

FIELD OF THE INVENTION

The present invention relates to network facsimile technology, particularly to a method for processing non-standard frames (NSF and NSS) by T.38 gateways during network facsimile.

BACKGROUND OF THE INVENTION

As Internet spreads and the technology becomes matured, it is possible to transmit facsimile information over Internet; therefore, techniques related with facsimile over IP, i.e., network facsimile emerge as the times require. Real-time T.38 facsimile over IP is a facsimile over IP technique that behaves well against packet loss and jitter, and is widely used in NGN. The architecture of real-time T.38 facsimile system is shown in FIG. 1. In the real-time facsimile over IP system, two terminal facsimile machines 1 and 2 communicate with each other in real time in T.30 protocol; in facsimile communication each time, the two facsimile machines perform signaling interaction or sending and receiving of messages; when the data modulated and transmitted by either of the facsimile machines passes through the gateway, the gateway demodulates the modulated signals and encapsulates the demodulated data into T.38-compliant IP packets, and then sends the packets to the opposite gateway via the IP network; the opposite gateway abstracts the data from the IP packets, modulates the data, and then sends the modulated data to the opposite facsimile machine.

Common facsimile machines usually support sending messages of facsimile pages at the modulation/demodulation rate specified in ITU-T V.27ter/V.29/V.17 protocol. In T.30 protocol, the facsimile process is divided into 5 stages, wherein stage B is a procedure before sending message for negotiation and training of facsimile capability, as shown in FIG. 2: the called transmitter, i.e., the called facsimile machine, sends its DIS (DIS, Digital Identification Signal, sent by the facsimile receiver) and possible CSI (Called Subscriber Identification) or NSF (Non-standard Facilities Frame), which indicates some attributes of facsimile operation are not specified in ITU standard; though the attributes are coded in FIFO, the coding mode is not specified) signal; when receiving the signal, the calling transmitter, i.e., the calling facsimile machine, feeds back a DCS (Digital Command Signal), which provides information related with rate of the modulator, image width, image code, and page length, and may contain TSI (Transmitting subscriber identification) signal containing its phone number or NSS (Non-Standard Setup) signal that responds to the NSF frame, and then the calling facsimile machine sends a TCF signal; when receiving the TCF (Training Check Field) signal, the called transmitter feeds back a CFR (Confirmation to Receive) signal.

In stage B of the facsimile process, as shown in FIG. 2, the TCF signal includes full zero data modulated and transmitted specified in ITU-T V.27ter/V.29/V.17 protocol; other signals, such as (NSF) (CSI) DIS, (TSI) DCS, CFR, are all frames in HDLC format transmitted and received at the rate and in the modulation mode specified in ITU-T V.21 protocol. The HDLC frame format of a V.21 signal is shown in FIG. 3.

In addition, the T.38 IFP (Internet Facsimile Protocol) packet of a complete V.21 frame includes: V.21 flag packet, i.e., T30-ind, which is a flag packet created for the flag sequence before the frame data; V.21 frame data packets, i.e., hdlc-data, which are created for the frame data from the address field to FCS (Frame Check Sequence) and may be multiple packets; FCS check result data packet, i.e., hdlc-fcs-ok if the data received and demodulated by the gateway is correct, or hdlc-fcs-bad if wrong; V.21 frame end packet, i.e., sig-end, which indicates the energy of V.21 frame signal received and demodulated by the gateway disappears.

After the called facsimile machine enters into stage B, it transmits a (NSF) (CSI) DIS signal actively, wherein NSF and CSI are optimal, the data bits in which carries performance parameters of the facsimile machine, including the modulation/demodulation protocols, coding format, and ECM mode, etc., supported by the facsimile machine in the message transmission stage. When the calling facsimile machine receives the DIS, it will negotiate with the called facsimile machine to determine the capability parameters supported by both parties in accordance with the capability information of the called facsimile machine carried in the DIS in combination with its own capability, and then sends the capability parameters to the called facsimile machine through a DCS. The called facsimile machine will determine the data rate for channel training and demodulation and receiving of facsimile page data in accordance with the capability parameters in the DCS.

In real-time T.38 facsimile over IP, when the DCS passes through the gateways, both the sending gateway and the receiving gateway will abstract the parameters in the DCS, so as to accomplish modulation/demodulation of TCF data and message data. Since the DCS is a standard frame specified in T.30 protocol, which means each bit in the data field in the DCS is specified in this protocol, the gateway can abstract the parameters from DCS and parse out information such as rate, etc.

As specified in T.30 protocol, in stage B, the facsimile machines can also negotiate parameters (e.g., rate) by means of signals such as NSF/NSS, etc. The process of rate negotiation by means of NSF signals in stage B is shown in FIG. 4. After the called facsimile machine enters into stage B, it transmits a NSF/(CSI)/DIS, wherein CSI is optional. The data field in NSF contains country code of the facsimile machine manufacturer, manufacturer code, model number of the facsimile machine, and mode in which the rate parameter is carried, etc.; when the calling facsimile machine receives the NSF signal and if the calling facsimile machine complies with the called facsimile machine manufacturer's proprietary specification, it will returns a NSS signal carrying the negotiation result: rate, whether support ECM mode, etc.; the subsequent process, i.e., the calling facsimile machine sends a TCF signal and the called facsimile machine transmits a CFR signal when receiving the TCF signal, is identical to the process for standard frames. However, in the case of network facsimile via T.38 gateways, since NSF and NSS are in the proprietary format specified by the facsimile machine manufacturer, T.38 gateways are unable to abstract the parameters required for modulation/demodulation; as a result, in the case that non-standard frames are used, the facsimile process will surely fail.

Therefore, in the prior art, the gateways have to determine V.21 frames received and demodulated at TDM (Time Division Multiplexing) side and V.21 frames received at IP side; if an NSF is received at TDM side, as shown in FIG. 5, the NSF will be discarded, i.e., the gateway will not encapsulate the NSF data into packets or send the packets to IP side. In this way, if the receiving facsimile machine sends a NSF/(CSI)/DIS, the signal that reaches actually to the transmitting facsimile machine will be only the (CSI)/DIS signal because the NSF is discarded by the gateway; and the transmitting facsimile machine will return a standard frame (TSI)/DCS as specified in T.30 protocol; wherein the DCS carries information including modulation/demodulation rate and ECM mode, etc.

If an NSF frame signal is received at IP side, as shown in FIG. 6, the gateway will discard the NSF frame signal, i.e., it does not modulate the frame data and send to the transmitting facsimile machine, but continue to receive subsequent (CSI)/DIS frames at IP side, and modulate and transmit the (CSI)/DIS frames normally.

In above solution, though in general cases that the gateways discard NSF signals so as to render the facsimile machines to carry rate information through DCS, however, the solution has the following disadvantages:

T.30 protocol specifies: before one V.21 frame or multiple consecutive V.21 frames are transmitted, a flag sequence (i.e., "0x7e" modulated in V.21 format) of 1s±15% length must be transmitted, and any frame with delay in receiving or detection longer than 3.45 s shall be discarded.

As shown in FIG. 7, since the gateways will discard NSF frame, the transmitting gateway begins to modulate and send 0x7e once it receives the first flag (0x 7e) in the preamble sequence, till it receives a subsequent DIS frame; in this way, the receiving facsimile machine will deem the DIS as the first frame signal and all previous "0x7e" as belonging to the preamble sequence. However, some facsimile machines start timing once they receive the first "0x7e" and will deem the receiving command as failed if the receiving of DIS does not finish within 3.45 s.

Furthermore, the gateways are in voice state initially, which switch to facsimile state only when they detect the characteristic signal of facsimile, CED or V.21 flag (preamble code of (NSF)/DIS).

In actual application of gateways, there are often cases that the gateways switch at a low speed or the receiving gateway fails to detect facsimile events; in these cases, since intervention of NSF signals by T.38 gateways is only applicable to T.38 facsimile state, NSF signals may be transmitted transparently (in voice state) to the transmitting facsimile machine, as shown in FIG. 8; the transmitting facsimile machine complying with the proprietary specifications will respond with a NSS signal, and thus the rate negotiation is still performed with proprietary frames; as a result, after the gateway switches to T.38 facsimile state, it is unable to abstract the rate parameter, resulting in facsimile failure.

Therefore, the prior art has disadvantages to some extent and shall be improved.

SUMMARY OF THE INVENTION

An object of the present invention is to provide a method for processing non-standard frames by T.38 gateways, i.e., the T.38 gateways modify the non-standard frames NSF and NSS, so that the network facsimile machines perform rate negotiation with standard frames ultimately and the gateways can abstract correct parameter information from standard frames DCS, and thereby network facsimile service can operate normally.

The technical solution of the present invention is as follows:

A method for processing non-standard frames by T.38 gateways, the T.38 gateways including at least one transmitting gateway and at least one receiving gateway, the transmitting gateway connected with a transmitting facsimile machine, the receiving gateway connected with a receiving facsimile machine, wherein the method includes:

a) the transmitting gateway and the receiving gateway determining the types of all received V.21 frames;

b) when the receiving gateway or the transmitting gateway receives a non-standard frame NSF, modifying the non-standard frame NSF, so that the corresponding receiving facsimile machine or transmitting facsimile machine is unable to receive a correct NSF frame;

c) the receiving gateway encapsulating the modified NSF frame data, or the transmitting gateway modulating the modified NSF frame data and transmitting the modulated frame data.

In the method, the modification of the non-standard frame NSF includes: modifying the country code byte to a number which does not correspond to any country name, and modifying the facility manufacturer byte and other parameters bytes randomly.

The method also includes:

d) when the transmitting gateway detects a receipt of a NSS frame, encapsulating the NSS frame data into packets, with the FCS of the NSS frame encapsulated into a FCS-BAD packet regardless of the actual result of FCS check, and sending the packets to the network side.

The method also includes:

e) when the receiving gateway detects a receipt of a NSS frame signal and an IFP packet resulted from the FCS check, treating the frame as BAD result mandatorily regardless of the actual check result, modulating the NSS frame data and transmitting the modulated data to the receiving facsimile machine, and modifying the value of FCS randomly when transmitting the FCS of the frame.

The method for processing non-standard frames by T.38 gateways according to the present invention modifies the facsimile rate negotiation in the facsimile process performed with proprietary frames as a negotiation performed with standard frames by processing of the gateways, so as to ensure that the gateways can abstract the rate parameter correctly, the network facsimile service can operate normally, and that the negotiation with non-standard frames can be converted to a negotiation with standard frames if the non-standard frames are transmitted transparently to the facsimile machine.

DETAILED DESCRIPTION OF THE EMBODIMENTS

Hereunder the preferred embodiments of the present invention will be described in detail.

Figure 1:
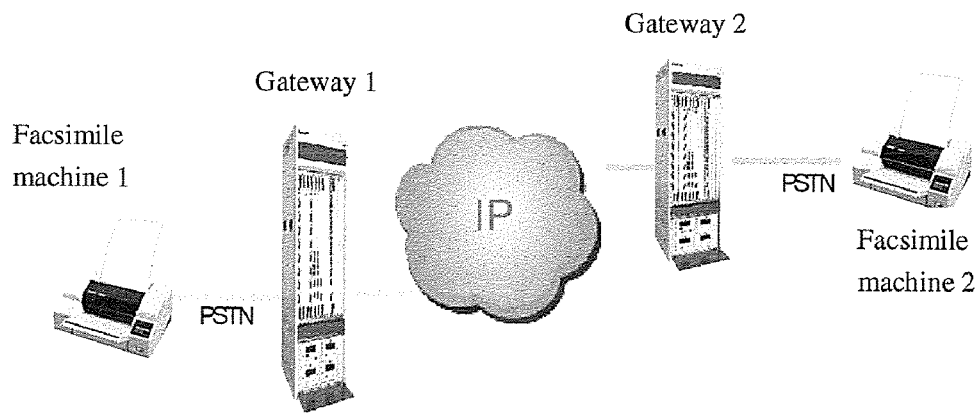
FIG. 1 is a schematic structural diagram of a real-time T.38 network facsimile system in the prior art.
Figure 2:
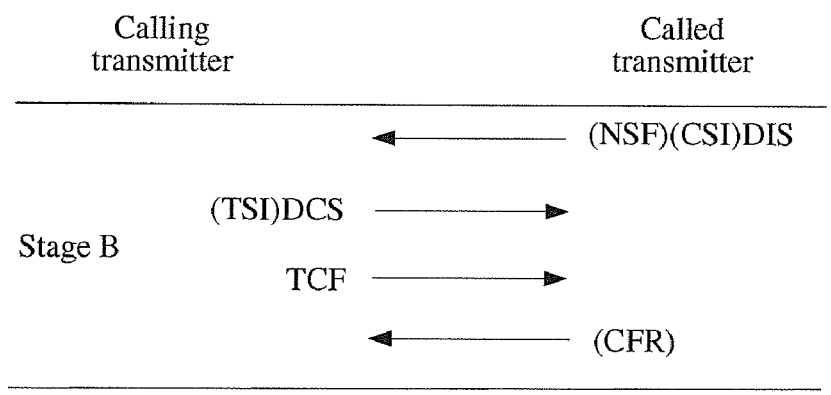
FIG. 2 is a schematic flow diagram of stage B in the ordinary facsimile process in the prior art.
Figure 3:
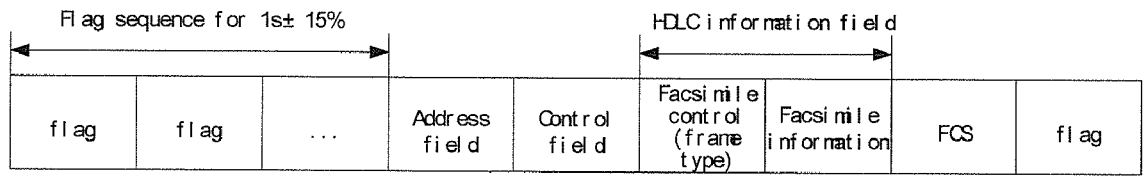
FIG. 3 is a schematic diagram of the HDLC frame format of a V.21 signal in the prior art.
Figure 4:
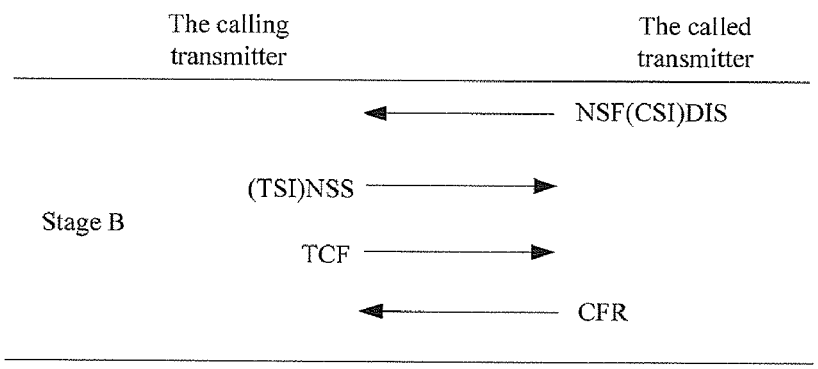
FIG. 4 is a schematic flow diagram of rate negotiation with NSF frames in the ordinary facsimile process in the prior art.
Figure 5:
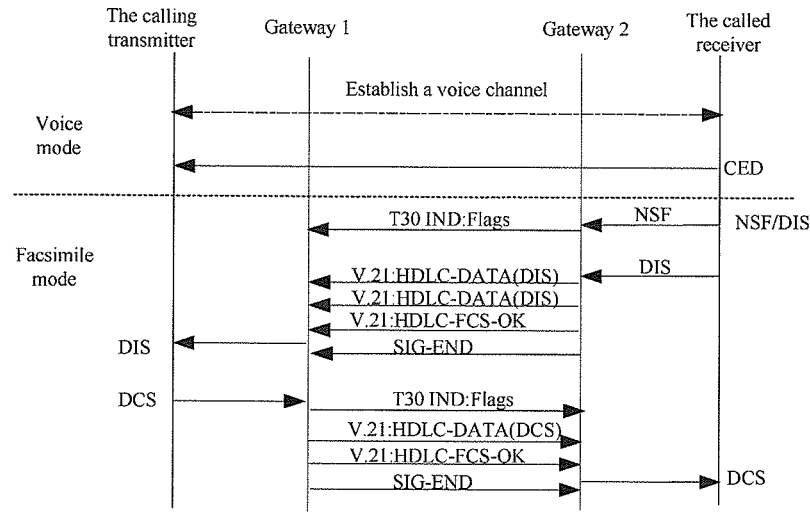
FIG. 5 is a schematic diagram of the processing flow when a NSF frame is received at TDM side in the network facsimile process in the prior art.
Figure 6:
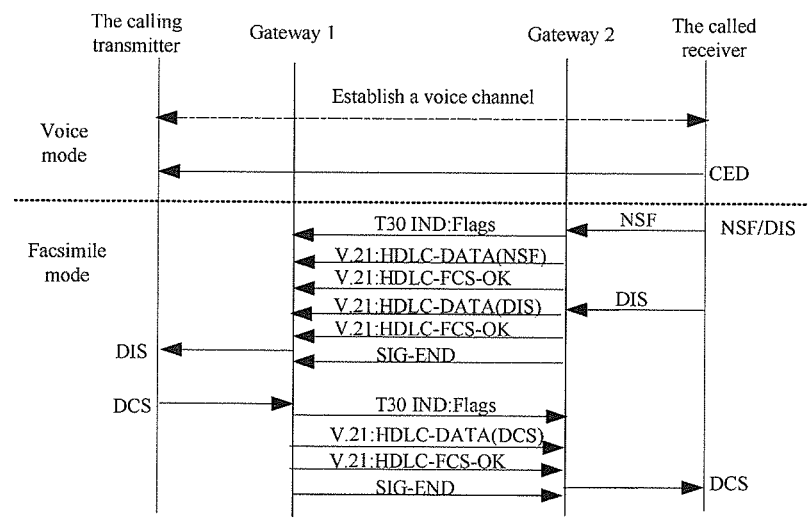
FIG. 6 is a schematic diagram of the processing flow when a NSF frame signal is received at IP side in the network facsimile process in the prior art.
Figure 7:
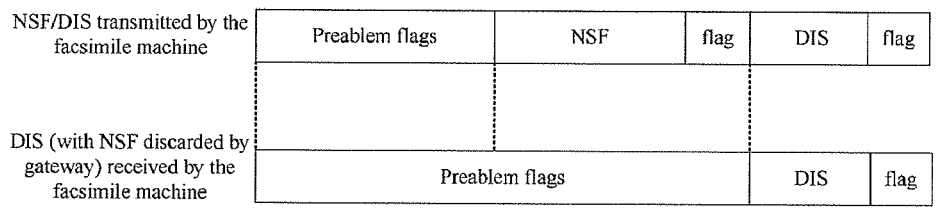
FIG. 7 is a schematic diagram of the effect of overlong flag resulted from the solution of discarding a NSF frame by a gateway in the prior art.
Figure 8:
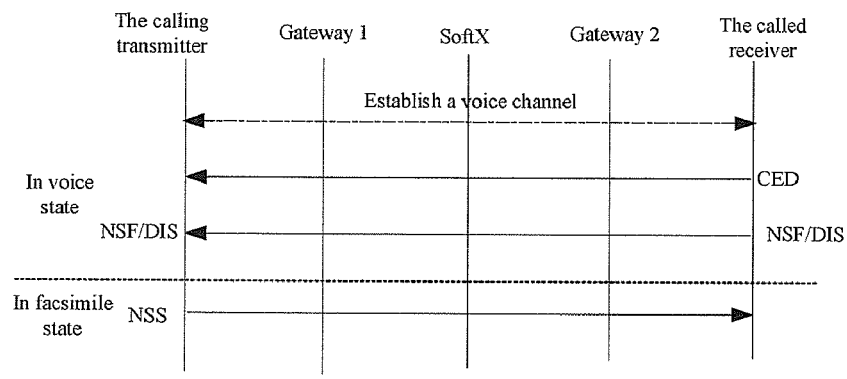
FIG. 8 is a schematic flow diagram showing that the gateway is unable to intervene when an NSF frame reaches to the transmitting facsimile machine in voice state in the prior art.
Figures 9, 10:
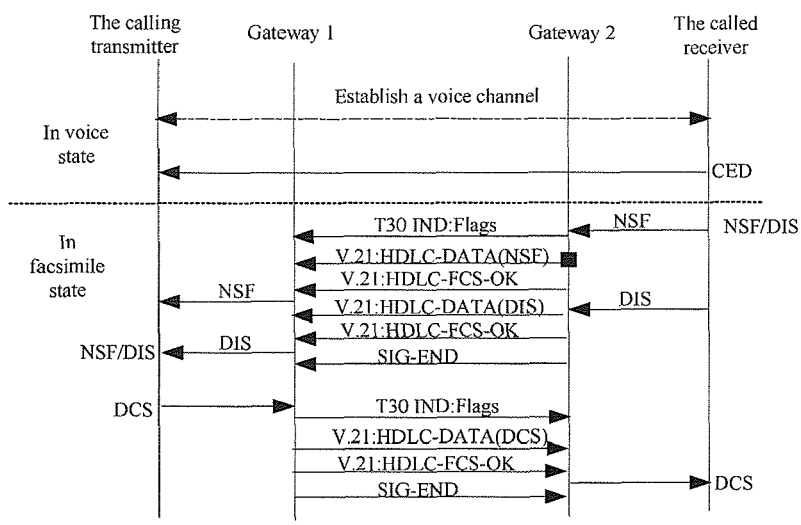
FIG. 9 is a schematic structural diagram of a NSF frame processed by the T.38 gateways according to an embodiment of the method of the present invention.
FIG. 10 is a schematic flow diagram of modification of NSF parameters by the receiving gateway according to an embodiment of the method of the present invention.

In the method for processing NSF frames by T.38 gateways according to an embodiment of the present invention, the structure of such a NSF frame is shown in FIG. 9; wherein, the NSF frame contains facsimile information, which includes country code, manufacturer code and other parameters; the gateway determines the types of V.21 frames received and demodulated at TDM side as well as V.21 frames received at IP side; if an NSF frame is received at TDM side, the receiving gateway modifies the facsimile information field in the NSF frame received and demodulated at TDM side, as shown in FIG. 10, wherein the shadowed square indicates the receiving gateway has modified the facsimile information byte in the NSF frame, i.e., modifies the country code byte in the NSF frame as a number which does not correspond to a country name and modifies the facility manufacturer byte and subsequent facsimile information randomly, wherein ITU-T T.35 protocol specifies a correspondence between country names and country codes. Next, the receiving gateway encapsulates the modified NSF frame data into packets and transmits the packets to the IP network. When the transmitting facsimile machine receives such a NSF frame processed in above manner, it abstracts information such as country code and manufacturer code and the like from the information field but finds the information is different from its own; therefore, the transmitting facsimile machine will not respond with a NSS frame signal; instead, it returns a standard DCS signal in accordance with the DIS.

Figure 11:
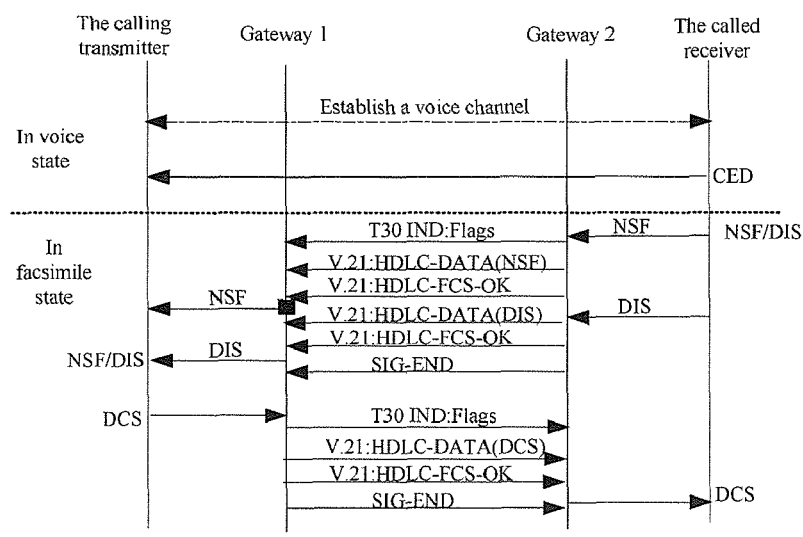
FIG. 11 is a schematic flow diagram of modification of NSF parameters by the transmitting gateway according to an embodiment of the method of the present invention.

If the transmitting gateway at IP side receives a NSF frame signal, the transmitting gateway modifies the facsimile information field in the NSF frame received at IP side, as shown in FIG. 11, wherein the shadowed square indicates the transmitting gateway has modified the information bytes in the NSF frame, i.e., modifies the country code byte in the NSF frame as a number which does not correspond to a country name and modifies the facility manufacturer byte and subsequent facsimile information randomly; then, it modulates the modified NSF frame data and transmits the same to the facsimile machine.

Figure 12:
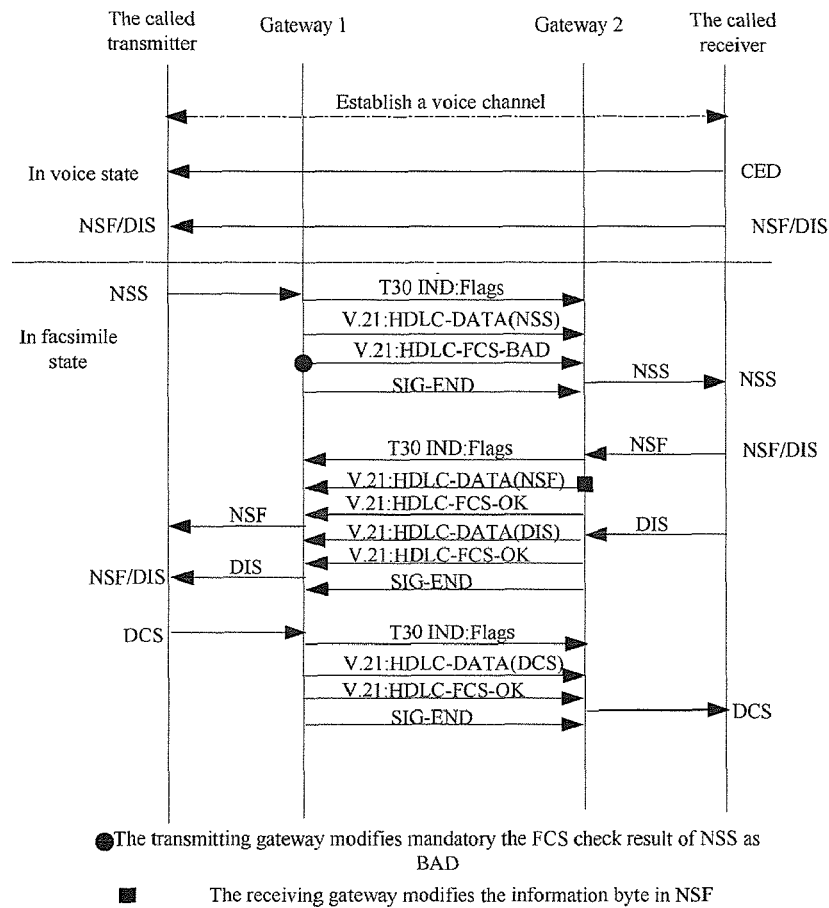
FIG. 12 is a schematic flow diagram of treatment of FCS check result for NSS frame by the transmitting gateway according to an embodiment of the method of the present invention.

In addition, in order to prevent the NSF frame from being transmitted transparently in voice coding mode to the transmitting facsimile machine through the voice channel, which results in the transmitting facsimile machine complying with proprietary specifications returns a NSS frame and the gateway is unable to abstract information such as the rate parameter and the like when receiving the NSS frame in T.38 facsimile state, the gateway performs as follows: after the gateway switches to T.38 facsimile state, it determines the types of V.21 frames received and demodulated at TDM side as well as V.21 frames received at IP side; if a NSS frame is received at TDM side, as shown in FIG. 12, wherein the shadowed circle indicates the transmitting gateway has modified the check result of the NSS frame as BAD mandatorily, and the shadowed square indicates the receiving gateway has modified the information bytes in the NSF frame; the transmitting gateway performs as follows: when receiving the NSS frame from the TDM side, it encapsulates the NSS frame data into packets and sends the packets to IP side, with the FCS encapsulated into a FCS-BAD packet, no matter whether the actual result of FCS check is OK or BAD; in this way, the receiving facsimile machine is forced to retransmit a NSF frame; the subsequent procedures are identical to the processing procedures for above NSF frame.

Figure 13:
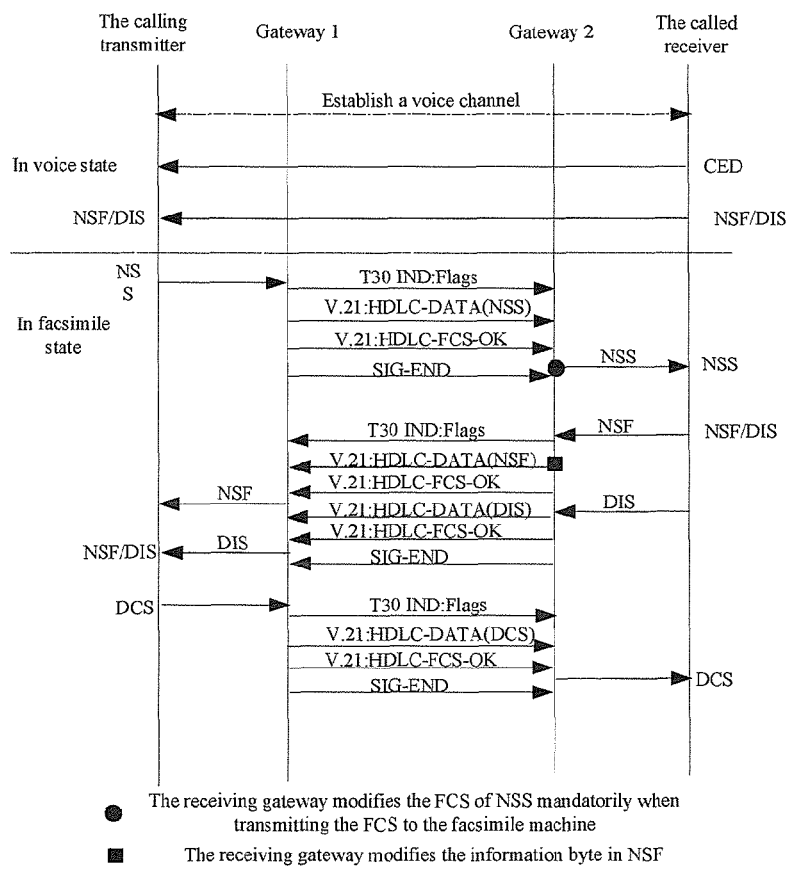
FIG. 13 is a schematic flow diagram of modulation and sending of the NSS frame received at IP side with the FCS as BAD by the receiving gateway according to an embodiment of the method of the present invention.

If a NSS frame signal is received at IP side, as shown in FIG. 13, wherein the shadowed circle indicates the receiving gateway has modified the check byte mandatorily when sending the FCS byte of a NSS frame to the facsimile machine, and wherein the shadowed square indicates the receiving gateway has modified the information bytes in the NSF frame, the receiving gateway performs as follows: when receiving the NSS frame and an IFP packet from IP side, it modulates the NSS data and sends the modulated data to the receiving facsimile machine; when sending the FCS of the frame, it treats FCS as BAD result mandatorily no matter whether the actual check result is OK or BAD, and then modifies the FCS value randomly and transmits the same.

In this way, since the gateway has modified the FCS of NSS frame, the receiving facsimile machine will deem the received NSS frame signal as error and will retransmit a NSF/DIS. As a result, the gateways can modify the retransmitted NSF frame with the above method of modification of NSF frame, to attain the object of performing rate negotiation using the standard frame signal DIS specified in T.30 protocol.

It should be understood that above embodiments are only provided to describe the present invention in further detail and shall not be deemed as any limitation to the protective scope of the present invention, which should be defined by the attached claims.

The invention claimed is:

1. A method for processing Non-Standard Facilities frame data by T.38 gateways, the T.38 gateways comprising at least one transmitting gateway and at least one receiving gateway, the transmitting gateway connected with a transmitting facsimile machine, the receiving gateway connected with a receiving facsimile machine, wherein the method comprises:
   if the receiving gateway receives a Non-Standard Setup (NSS) frame data from the transmitting gateway, modifying, by the receiving gateway, randomly a frame check sequence of the NSS frame data, and
   modulating, by the receiving gateway, the modified NSS frame data and transmitting the modulated modified NSS frame data to the receiving facsimile machine; or
   if the transmitting gateway receives a Non-Standard Setup (NSS) frame data from the transmitting facsimile machine, modifying, by the transmitting gateway, a check result of the NSS frame data as BAD, and
   encapsulating, by the transmitting gateway, the modified NSS and sending the encapsulated modified NSS to the receiving gateway; and
   the method further comprises:
   in response to the receiving facsimile machine receiving the modified NSS, receiving a non-standard frame (NSF) generated by the receiving facsimile machine, modifying a country code of the NSF such that a Non-Standard Setup (NSS) frame signal will not be returned from the transmitting facsimile machine, and transmitting the modified NSF to the transmitting facsimile machine.

2. The method according to claim 1, wherein modifying the country code of the NSF comprises:
   modifying, by the receiving gateway, the country code into a number not corresponding to any country name.

3. The method according to claim 1, wherein modifying the country code of the NSF comprises:
   modifying, by the transmitting gateway, the country code into a number not corresponding to any country name.

4. The method according to claim 1, wherein modifying, by the transmitting gateway, a check result of the NSS frame data as BAD, further comprises:
   encapsulating, by the transmitting gateway, the modified check result of the NSS frame data into a Frame Check Sequence Bad (HDLC-FCS-BAD) packet, and sending the packet to the receiving gateway.

5. A method for processing Non-Standard Facilities frame data by T.38 gateways, the T.38 gateways comprising at least one transmitting gateway and at least one receiving gateway, the transmitting gateway connected with a transmitting facsimile machine, the receiving gateway connected with a receiving facsimile machine, wherein the method comprises:
   if the receiving gateway receives a Non-Standard Setup (NSS) frame data from the transmitting gateway, modifying, by the receiving gateway, randomly a frame check sequence of the NSS frame data, modulating, by the receiving gateway, the modified NSS frame data and transmitting the modulated modified NSS frame data to the receiving facsimile machine; or
   if the transmitting gateway receives a Non-Standard Setup (NSS) from a transmitting facsimile machine, modifying, by the transmitting gateway, a check result of the NSS frame data as BAD, encapsulating, by the transmitting gateway, the modified NSS and transmitting the encapsulated modified NSS to the receiving gateway;
   and the method further comprises:
      after the receiving facsimile machine receives the modified NSS, receiving from the receiving facsimile machine a non-standard frame (NSF),
      modifying facsimile information of the NSF such that the transmitting facsimile machine will not generate a Non-Standard Setup (NSS) frame signal, and
      transmitting, to the transmitting facsimile machine, the modified NSF.

6. The method according to claim 5, wherein modifying the facsimile information of the NSF further comprises:
   modifying randomly a facility manufacturer code in the facsimile information.

7. The method according to claim 5, wherein modifying the facsimile information of the NSF comprises:
   modifying, by the receiving gateway, a country code into a different number.

8. The method according to claim 7, wherein the different number does not the correspond to any country name.

9. The method according to claim 5, wherein modifying the facsimile information of the NSF comprises:
   modifying, by the transmitting gateway, a country code into a different number.

10. The method according to claim 9, wherein the different number does not the correspond to any country name.

* * * * *

UNITED STATES PATENT AND TRADEMARK OFFICE
CERTIFICATE OF CORRECTION

| | | |
|---|---|---|
| PATENT NO. | : 8,355,181 B2 | Page 1 of 1 |
| APPLICATION NO. | : 11/347441 | |
| DATED | : January 15, 2013 | |
| INVENTOR(S) | : Ruihua Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1250 days.

Signed and Sealed this
Eighteenth Day of November, 2014

Michelle K. Lee
*Deputy Director of the United States Patent and Trademark Office*